US009450437B2

United States Patent
Kim et al.

(10) Patent No.: US 9,450,437 B2
(45) Date of Patent: Sep. 20, 2016

(54) CAPACITOR CIRCUIT FOR ARRAYS OF POWER SOURCES SUCH AS MICROBIAL FUEL CELLS

(71) Applicant: The Penn State Research Foundation, University Park, PA (US)

(72) Inventors: Younggy Kim, State College, PA (US); Bruce E. Logan, State College, PA (US); Marta Hatzell, State College, PA (US)

(73) Assignee: The Penn State University, University Park, PA (US)

( * ) Notice: Subject to any disclaimer, the term of this patent is extended or adjusted under 35 U.S.C. 154(b) by 1030 days.

(21) Appl. No.: 13/625,372

(22) Filed: Sep. 24, 2012

(65) Prior Publication Data

US 2013/0076145 A1    Mar. 28, 2013

Related U.S. Application Data

(60) Provisional application No. 61/538,356, filed on Sep. 23, 2011.

(51) Int. Cl.
*H02J 1/00* (2006.01)
*H02J 3/00* (2006.01)
(Continued)

(52) U.S. Cl.
CPC ............ *H02J 7/0063* (2013.01); *H01M 16/00* (2013.01); *H01M 16/006* (2013.01); *H02M 5/42* (2013.01); *H01M 8/16* (2013.01); *Y10T 307/685* (2015.04)

(58) Field of Classification Search
CPC .. H02M 5/42; H02M 3/07; H02M 2001/007; H02J 1/102; G05F 1/10

USPC ....... 307/77, 85, 66, 64, 87; 363/44, 89, 84; 607/9, 72, 7; 327/534, 536, 537
See application file for complete search history.

(56) References Cited

U.S. PATENT DOCUMENTS

| 5,948,004 A | 9/1999 | Weijand et al. | |
|---|---|---|---|
| 2004/0264223 A1* | 12/2004 | Pihlstrom | H02M 3/07 363/89 |

(Continued)

FOREIGN PATENT DOCUMENTS

| JP | 2008245493 A | 10/2008 |
|---|---|---|
| WO | 2009136368 A1 | 11/2009 |

OTHER PUBLICATIONS

Hongwei Gao, et al., New Microbial Fuel Cell Power Systems for Efficiency Improvement, Electrical Machines and Systems (ICEMS), Aug. 2011, pp. 1-5, Beijing, China.

(Continued)

*Primary Examiner* — Rexford Barnie
*Assistant Examiner* — Jagdeep Dhillon
(74) *Attorney, Agent, or Firm* — Dinsmore & Shohl LLP; Douglas L. Wathen

(57) ABSTRACT

An electronic circuit to increase voltages from one or more energy sources. The electronic circuit can include a first set of capacitors and a second set of capacitors, and a first set of switches associated with the first set of capacitors and a second set of switches associated with the second set of capacitors. Also included is at least one energy source and an external load. The first and second set of capacitors, first and second set of switches, the at least one energy source, and the external load are arranged and connected such that the first set of capacitors is connected to the at least one energy source in parallel while the second set of capacitors is connected to the external load in series, and vice versa.

22 Claims, 5 Drawing Sheets

(51) Int. Cl.
*H02J 7/00* (2006.01)
*H02M 5/42* (2006.01)
*H01M 16/00* (2006.01)
*H01M 8/16* (2006.01)

(56) References Cited

U.S. PATENT DOCUMENTS

2009/0174466 A1 7/2009 Hsieh et al.
2009/0220827 A1* 9/2009 Knaggs ............. H01M 8/04552
429/483
2010/0279178 A1* 11/2010 Barkeloo ................ H01M 8/16
429/401

OTHER PUBLICATIONS

Written Opinion dated Mar. 15, 2013.
Aelterman, P., et al., Continuous Electricity Generation at High Voltages and Currents Using Stacked Microbial Fuel Cells, Environmental Science and Technology, 40(10): 3388-3394, 2006.
Oh, S., et al, Voltage Reversal During Microbial Fuel Cell Stack Operation, Journal of Power Sources, 167(1), 11-17, 2007.

* cited by examiner

CAPACITOR CIRCUIT FOR ARRAYS OF POWER SOURCES SUCH AS MICROBIAL FUEL CELLS

CROSS-REFERENCE TO RELATED APPLICATIONS

This application claims priority of U.S. Provisional Application 61/538,356, filed Sep. 23, 2011, the contents of which are incorporated herein by reference.

FIELD OF THE INVENTION

The present invention is related to a capacitor circuit, and in particular a capacitor circuit for arrays of power sources such as microbial fuel cells that can provide a constant energy supply with avoidance of voltage reversal.

BACKGROUND OF THE INVENTION

In-series application of reaction-based energy systems [e.g., batteries, fuel cells, and microbial fuel cells (MFCs)] can be limited by a phenomenon called voltage reversal. Voltage reversal occurs, for instance, when multiple batteries are arranged in series and one battery malfunctions due to reduced power capability while the other batteries are actively providing electric potentials. Under such a circumstance, electrode reactions in the malfunctioning battery are governed by the electric potentials of the adjacent batteries. As such, the anode of the malfunctioning battery is governed by a cathode potential from an adjacent battery and thus becomes more positive than the cathode of the malfunctioning battery which is dominated by an active anode of an adjacent battery. As a result, reduction occurs at the malfunctioning anode and battery materials are oxidized at the malfunctioning cathode. This "voltage reversal" not only prevents stable operation of the multiple battery system, but can also damage electrode systems of the malfunctioning battery.

Voltage generation from commercial batteries or fuel cells is generally less vulnerable against voltage reversal problems because their electrode reactions are chemically driven and therefore very stable. However, if electrode reactions are driven biologically by microorganisms, an in-series system can be more affected by voltage reversal as reported for MFCs (e.g. see Aelterman et al. 2006, Oh and Logan 2007). An MFC is a bioelectrochemical system for harvesting electric energy from aqueous organic matter. Exoelectrogenic bacteria at an MFC anode oxidize organic matter and simultaneously transfer electrons to the anode. A typical counter reaction at an MFC cathode is reduction of oxygen. This red-ox couple (i.e., oxygen reduction and oxidation of organic matter) creates a maximum theoretic voltage of 1.1 V (12-mM acetate as organic matter; $p_{O2}$=0.2 atm; pH=7) (Logan 2008), however open circuit potentials of a well-controlled laboratory MFC usually do not exceed 0.8 V.

While MFCs can be used to convert organic contaminants in wastewater into electric energy, the low voltage problems have been one limiting factor for practical applications in large scale wastewater treatment plants. Attempts have been made to overcome the low voltage problems, but results have been unsuccessful. For example, multiple MFCs were arranged in series to increase output voltages; however, voltage reversal was easily induced by an imbalance in organic matter concentration (Oh and Logan 2007) and by a high current condition (Aelterman et al. 2006). Thus, in-series operation of MFCs has heretofore not been an option for practical applications of MFCs.

SUMMARY OF THE INVENTION

An electronic circuit to increase voltages from an energy source is provided. The electronic circuit can include a first set of capacitors and a second set of capacitors, and a first set of switches associated with the first set of capacitors and a second set of switches associated with the second set of capacitors. Also included is at least one energy source and an external load. The first and second set of capacitors, first and second set of switches, at least one energy source, and external load are arranged and connected such that the first set of capacitors is connected to the at least one energy source in parallel while the second set of capacitors is connected to the external load in series, and vice versa. Such an arrangement provides for alternately charging the first and second set of capacitors when connected in parallel with the at least one energy source while the second and first set of capacitors in series with the external load, respectively, are discharging. In some instances, two or more energy or power sources are used and voltage reversal is avoided between the energy sources since they are not connected in series and operation of one energy source does affect energy or power generation of another energy source.

The first and second set of capacitors can be switched from the parallel arrangement to the series arrangement, and vice versa, by a pair of electronic switches connected to a positive end or terminal and a negative end/terminal of each capacitor. In addition, the electronic switches can be operated by an automated program and thus provide a generally steady energy output to the external load.

In some instances, the energy source can be an array of multiple fuel cells, e.g. microbial fuel cells (MFCs), arranged in parallel to charge the capacitors and thereby avoid voltage reversal, while in other instances the energy source can be an array of multiple rechargeable batteries arranged in parallel. In still other instances, the energy source can be an array of multiple primary batteries arranged in parallel to avoid voltage reversal and in still yet another instance, the at least one energy source can be an array of multiple microbial fuel cells arranged in parallel. It is appreciated that an array of multiple microbial fuel cells can enhance oxidation of organic matter and may or may not contain a microbial electrolysis cell that produces hydrogen. Finally, the first set or second set of capacitors can provide power back to at least one energy source in order to improve performance thereof.

A process for providing increased voltages from a MFC is also disclosed. The process can include providing the first set of capacitors, second set of capacitors, first set of switches associated with the first set of capacitors, and the second set of switches associated with the second set of capacitors. In addition, the MFC can be the at least one energy source and an external load is also included. The components are connected in a manner such that the first and second set of capacitors are connected to the MFC in parallel when the first and second set of switches are in a first position while the first and second set of capacitors are connected to the external load in series when the first and second set of switches are in a second position. The process then includes alternately charging the first and second set of capacitors with the MFC by placing the first set of switches and the second set of switches, respectively, in the first position and alternately discharging the first and second set of capacitors to the external load by placing the first set of switches and the second set of switches, respectively, in the second position. It is appreciated that the first set of capacitors can be charged by the MFC while the second set of capacitors is being discharged to the external load, and vice versa.

DETAILED DESCRIPTION OF THE PREFERRED EMBODIMENTS

The present invention provides a method and/or system to capture energy at high voltages from multiple power sources, such as an array of microbial fuel cells (MFCs), without voltage reversal problems. In the inventive system, voltages can be effectively combined from multiple power sources without voltage reversal by using an electronic circuit built with capacitors. One or more power sources charge one or more capacitors in parallel, and then the capacitors are discharged in series, achieving an increase in the voltage in proportion to the number of capacitors charged and their individual voltages.

Figure 1A:
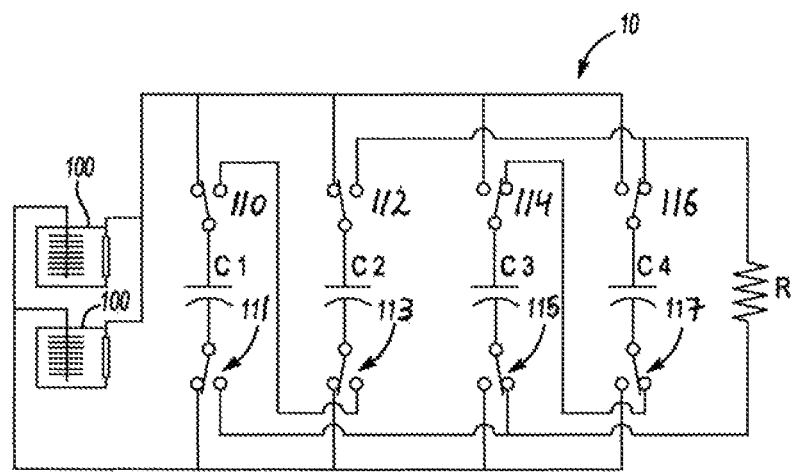
FIG. 1 is a schematic diagram of an electronic circuit according to an embodiment of the present invention (A) as a whole circuit and (B) as a simplified circuit showing only closed circuit lines.
Figure 1B:
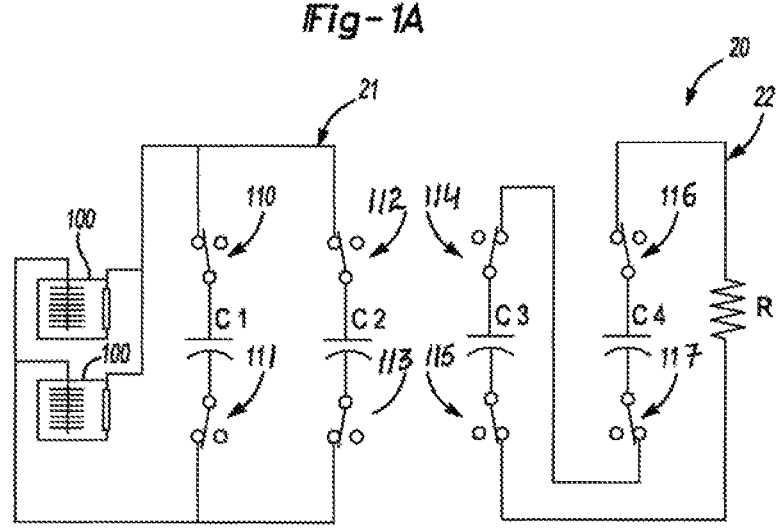

An example of two MFCs 100 charging four capacitors C1-C4 according to an embodiment of the present invention is shown for illustrative purposes in FIG. 1A at reference numeral 10. A simplified circuit diagram is shown in FIG. 1B at reference numeral 20 where the circuit 10 is shown as isolated circuits 21, 22 to better illustrate the charging and discharging patterns. In FIG. 1B, capacitors C1 and C2, which are charged from the MFCs 100, are arranged in parallel, while capacitors C3 and C4, which discharge to an external load (R), are arranged in series. In addition, the MFCs 100 are connected in parallel as they charge C1 and C2. Thus, this in-parallel arrangement 21 for both the MFCs and charging capacitors (C1 and C2) prevents voltage reversal in the MFCs, while the in-series arrangement 22 for the discharging capacitors (C3 and C4) increases output voltages to the external load.

Switches are used to control which capacitors are charged or discharged. In the illustrative example, a SPDT (single pole double throw) type switch 110 is connected to each end of a capacitor (FIGS. 1A & 1B), so that the switch controls whether the capacitor is under the charging or discharging condition. By using the switches, two capacitor sets (e.g., one set of C1 and C2 and the other set of C3 and C4) alternate the charging and discharging roles to stably deliver electric energy from the MFCs to the external load. For instance, in an example based on FIGS. 1A & 1B (i.e., C1 and C2 for charging and C3 and C4 for discharging), the given charging and discharging system is maintained for one second, and for the following one second, C1 and C2 discharges to the external load and C3 and C4 are charged from the MFCs. These two distinct steps can be repeated so that the MFC power is continuously and stably delivered to the external load (R). The alternating time interval can be varied, and depends for example, on the number of capacitors, the total capacitance of the capacitors, and the response time of employed switches.

This inventive system can be used for multiple additional purposes. One MFC can be used to provide power for another MFC in order to increase current in the second MFC. Power can sometimes decrease in an MFC, for example, when substrate concentrations are low and thus the current is low. By adding the voltage from the capacitors in the circuit to another MFC, the current density can be increased and thereby afford faster removal of substrate in the second MFC. This arrangement can be done with individual electrodes, multiple electrodes, or combinations therein to better control current and voltages from arrays of electrodes and MFCs. The inventive system, which uses energy to charge a resistor, can also be used to power a microbial electrolysis cell (MEC). The systems can be hooked up in such as way as to power individual electrodes or completely separate reactors. For example two MFCs could charge a capacitor that is then discharged to the MEC. By alternately charging two sets of capacitors as described above, nearly constant current can be delivered to the MEC for hydrogen gas production or methane production.

In order to better teach the invention and yet not limit its scope in any way, one or more examples are provided below.

Example 1

Proof of Voltage Increase

Figure 2A:
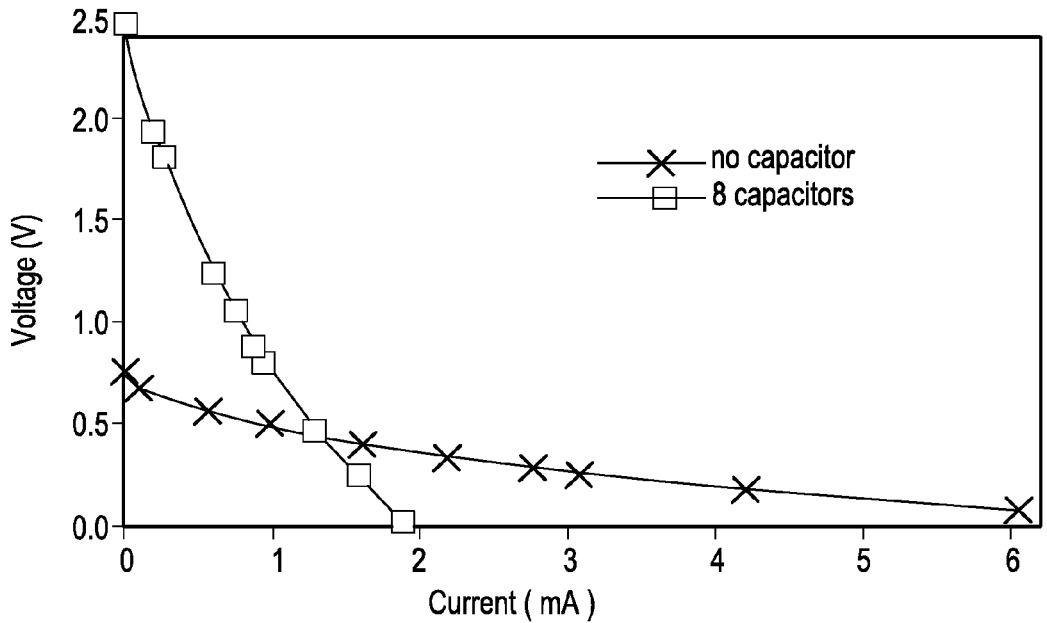
FIG. 2 is a pair of graphs illustrating (A) output voltage and (B) power from a single microbial fuel cell (MFC) with and without connection to an inventive capacitor circuit according to an embodiment of the present invention.
Figure 2B:
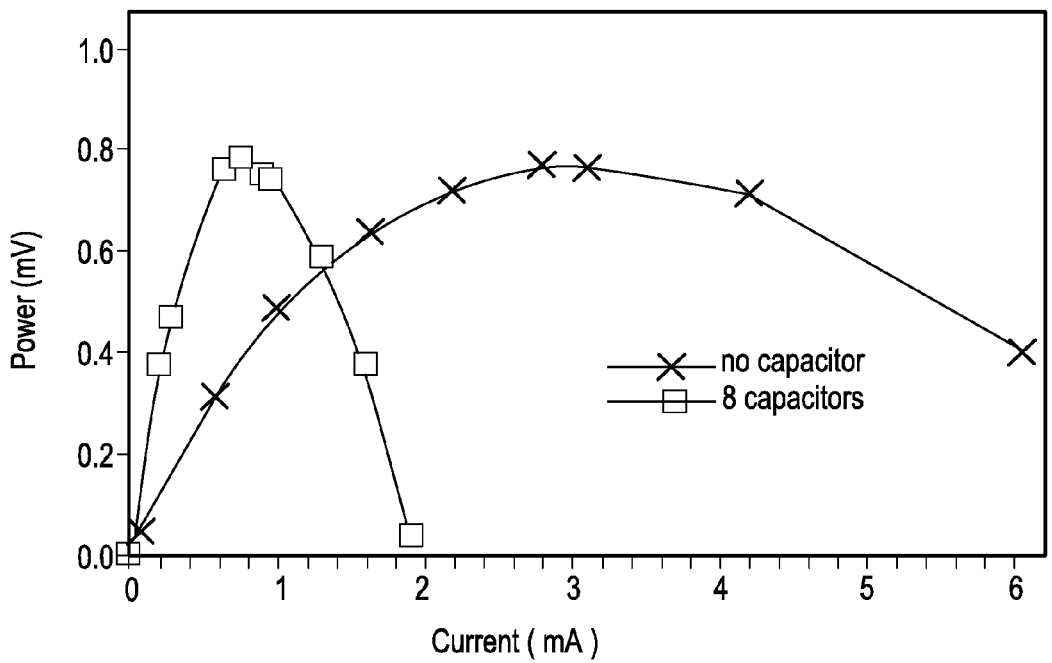

In the lab, an electronic circuit system was built with 8 capacitors (1-F capacitance, M-series, Cooper Bussmann, MO). Switches (5 VDC/1 A SPDT Micro Relay, RadioShack, TX) were controlled by a programmable microcontroller (Mega2560, Arduino, Italy) to alternate the charging and discharging conditions every one second. As an example, a single MFC was connected to an external load via an electronic circuit that had 8 capacitors (FIG. 2). Resulting voltages from a single MFC were successfully increased. For instance, the open circuit voltage of the MFC (0.7 V) was increased up to 2.5 V via the capacitor circuit (FIG. 2A). The maximum power of the MFC was ~0.8 mW, and this maximum power was maintained with the circuit, indicating there were negligible energy losses in the circuit (FIG. 2B).

Example 2

Comparison with in-Series System

Figure 3A:
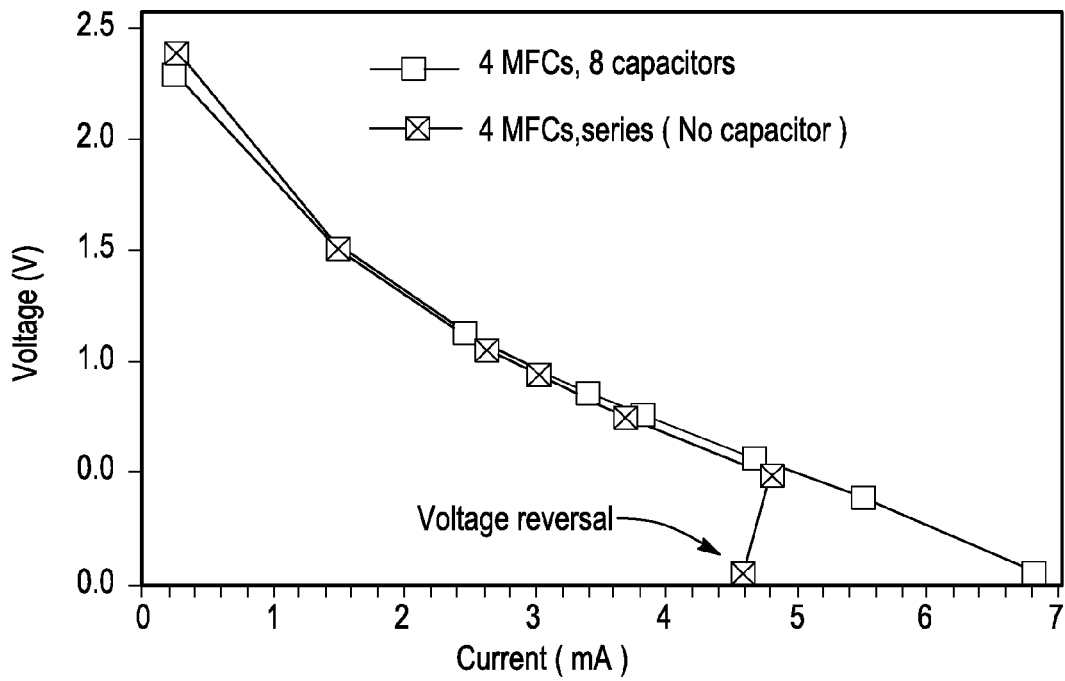
FIG. 3 is a pair of graphs illustrating (A) voltage and (B) power generation from four MFCs with and without connection to an eight-capacitor inventive circuit according to an embodiment of the present invention or a simple in-series arrangement.
Figure 3B:
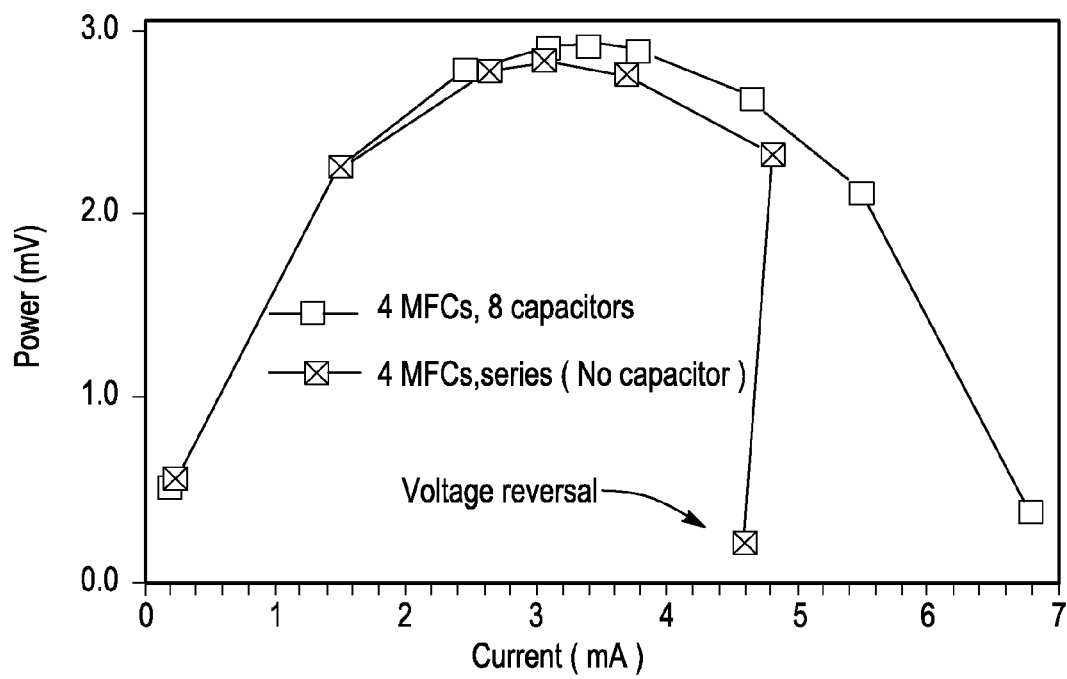

The capacitor circuit of 8 capacitors was further examined with 4 MFCs, and its performance was compared with that from the same 4 MFCs arranged in series without the capacitor circuit. The voltage and power performance was almost identical if the voltage reversal failure is ignored for the in-series results (FIG. 3A). In addition, the identical maximum power at ~2.9 mW confirms negligible energy losses in the circuit under maximum power conditions (FIG. 3B).

Example 3

Proof of Eliminated Voltage Reversal

Figure 4:
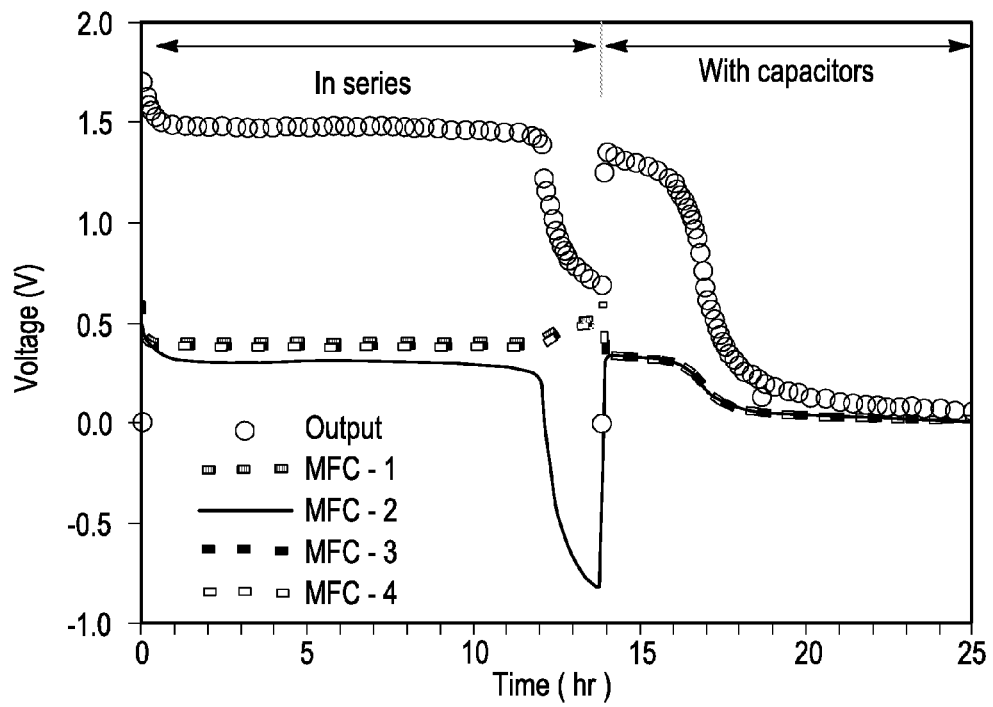
FIG. 4 is a graph illustrating induced voltage reversal for an inventive capacitor circuit according to an embodiment of the present invention.

Another set of experiments was performed with 4 MFCs to prove that voltage reversal was eliminated with the capacitor circuit. Voltage reversal was intentionally induced as one MFC (MFC-2) was initially fed with low substrate concentration (0.5 g/L sodium acetate) while the other MFCs (MFCs-1, 3, and 4) were fed with 1 g/L sodium acetate. Due to the imbalanced organic matter concentrations, voltage reversal started in MFC-2 at ~12 hours as the 4 MFCs were operated in series without the capacitor circuit (FIG. 4). As a result of the voltage reversal, the total output voltage dropped quickly from 1.5 to 0.7 V. As soon as the 4 MFCs were connected to the 8 capacitor circuit, the voltage reversal disappeared from MFC-2 and the total output voltage was restored from 0.7 to 1.4 V.

Figure 5:
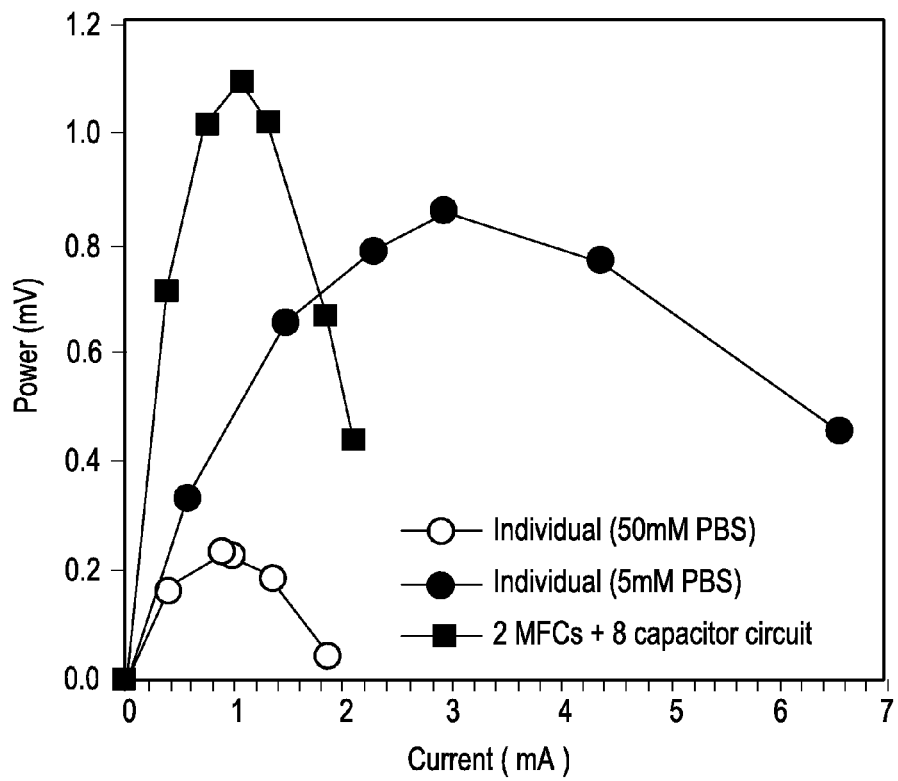
FIG. 5 is a graph illustrating additive maximum power from individual MFCs and comparison to maximum power when using the same MFCs with an inventive capacitor circuit according to an embodiment of the present invention.

The maximum power produced by the MFCs was shown not to be altered by external factors. In particular, experiments were conducted with two MFCs containing different phosphate buffer concentrations (50 mM and 5 mM) in order to produce different maximum power densities. The 50 mM cm$^{-1}$ solution had a conductivity of 7.4 mS cm$^{-1}$ and the 5 mM solution had a conductivity 0.9 mS cm$^{-1}$. In addition, and due to the different solution conductivities, the maximum power from the 5 mM MFC was only 0.22 mW, which was approximately one fourth of the maximum power of 0.85 mW from the 50 mM MFC. Also, the sum of the individual maximum powers was 1.07 mW, which is almost identical to 1.09 mW produced from the two MFCs connected to 8 capacitors in the electronic circuit as illustrated in FIG. 5. As such, the comparison verifies that in a practical power system with numerous MFCs, power generation with the capacitor circuit will not be limited by a few malfunctioning MFCs.

Figure 6A:
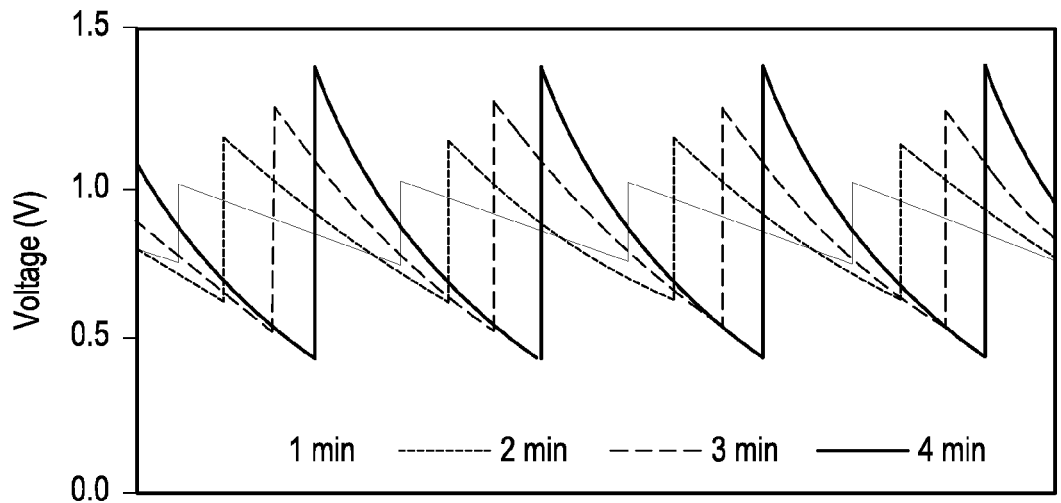
FIG. 6 is a pair of graphs illustrating (A) voltage and (B) power variation from a single MFC with elongated charging and discharging time intervals (DT) connected to an inventive capacitor circuit according to an embodiment of the present invention.
Figure 6B:
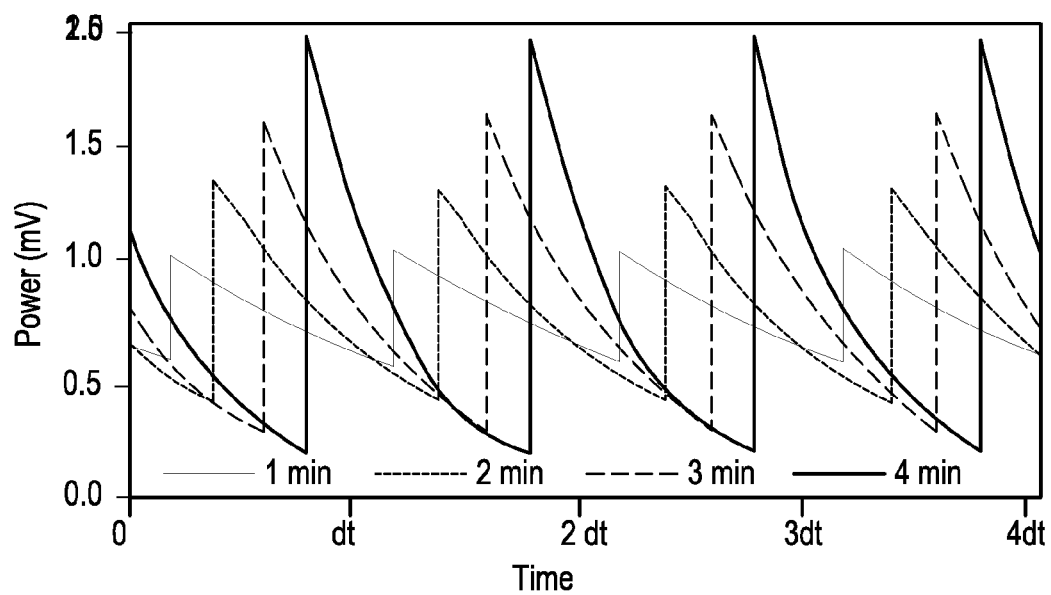

The inventive circuit disclosed herein can also be used to further increase maximum power over a short time period by increasing the charging and discharging cycle time. For example, a single MFC was connected to a 1000 ohm external resistance through the electronic circuit having 8 capacitors and as the time period for charging and discharging (dt) increased from 1 to 4 min, the magnitude of the voltage oscillation increased from 30 to 110% of the average voltage (0.85 V) as illustrated in FIG. 6A. It is appreciated that even with substantial voltage oscillation, the average voltage was stable and varied by only ±3% over the various time intervals. The peak voltage reached 1.39 V and the peak power was 1.95 mW for a 4-minute time interval (FIGS. 6A and 6B) whereas the peak power was 2.5 times the maximum power with the one-second time interval (0.78 mW as shown in FIG. 4B). As such, the data illustrate that the inventive capacitor circuit can be used as a power management system to harvest lower MFC power densities over a relatively longer time and then release high power over a shorter time interval to operate electronic devices. Considering the relatively simple design and negligible power losses, compared to previous circuits built with a DC-DC converter, the capacitor circuit design has a significant potential for such different applications.

In summary, the inventive circuit disclosed herein can eliminate voltage reversal by using arrangements of multiple capacitors. While a DC-DC converter requires a minimum input voltage that is typically larger than the working voltage of an MFC (0.5 V), even a very small voltage at the end of a fed-batch cycle (e.g., <0.01 V) can be boosted using the capacitor-based circuit disclosed herein. In addition, based on maximum power densities produced using the capacitors in the circuit, there were minimal energy losses. In comparison, a power management system with a DC-DC converter can lose 40% of the produced power under similar current conditions. Therefore, the circuit design described here can be used to boost MFC voltages in a stable and efficient way. The inventive circuit can also produce higher power densities over shorter time intervals by controlling the time interval for charging and discharging the capacitors.

In view of the teaching presented herein, it is to be understood that numerous modifications and variations of the present invention will be readily apparent to those of skill in the art. As such, the foregoing is illustrative of specific embodiments of the invention, but is not meant to be a limitation upon the practice thereof and the specification should be given a broad interpretation.

REFERENCES

Aelterman, P., Rabaey, K., Pham, H. T., Boon, N. and Verstraete, W. (2006) Continuous electricity generation at high voltages and currents using stacked microbial fuel cells. Environmental Science and Technology 40, 3388-3394.
Oh, S.-E. and Logan, B. E. (2007) Voltage reversal during microbial fuel cell stack operation. Journal of Power Sources 167(1), 11-17.
Logan, B. E. (2008) Microbial fuel cells, John Wiley & Sons, Inc., Hoboken, N.J.

The invention claimed is:
1. An electronic circuit to increase voltages from at least one energy source with relatively low voltages to an external load, said electronic circuit comprising:
a first set of capacitors and a second set of capacitors;
a first set of switches associated with said first set of capacitors and a second set of switches associated with said second set of capacitors; and
said first and second set of capacitors, said first and second set of switches, the at least one energy source and the external load operatively switching between a first mode and a second mode such that:
during the first mode said first set of capacitors are connected to the at least one energy source in parallel by said first set of switches and not connected by said second set of switches or connected to said second set of capacitors while said second set of capacitors are connected to the external load in series by said second set of switches and not connected by said first set of switches or connected to said first set of capacitors, and
during the second mode said second set of capacitors are connected to the at least one energy source in parallel by said second set of switches and not connected by said first set of switches or connected to said first set of capacitors while said first set of capacitors are connected to the external load in series by said first set of switches and not connected by said second set of switches or connected to said second set of capacitors;

thereby alternately charging said first and second set of capacitors in parallel with the at least one energy source and avoiding voltage reversal and discharging said second and first set of capacitors in series with the external load, respectively, and providing a continuous, stable and increase in output voltage from the at least one energy source.

2. The electronic circuit of claim 1, wherein said first and second set of capacitors are switched from said parallel arrangement to said series arrangement, and vice versa, by a pair of electronic switches connected to a positive end and a negative end of each capacitor.

3. The electronic circuit of claim 2, wherein said electronic switches are operated by an automated program.

4. The electronic circuit of claim 1, wherein the at least one energy source is an array of multiple fuel cells arranged in parallel.

5. The electronic circuit of claim 1, wherein the at least one energy source is an array of multiple rechargeable batteries arranged in parallel.

6. The electronic circuit of claim 1, wherein the at least one energy source is an array of multiple primary batteries arranged in parallel.

7. The electronic circuit of claim 1, wherein the at least one energy source is an array of multiple microbial fuel cells arranged in parallel and the array of multiple fuel cells enhance oxidation of organic matter.

8. The electronic circuit of claim 7, wherein said array of multiple microbial fuel cells contain a microbial electrolysis cell that produces hydrogen.

9. The electronic circuit of claim 1, wherein said first set or said second set of capacitors provide power back to the at least one energy source in order to improve performance thereof.

10. An electronic circuit to increase voltages from at least one energy source with relatively low voltages to an external load, the at least one energy source having a plurality of microbial fuel cells arranged in parallel, said electronic circuit comprising:

a first set of capacitors and a second set of capacitors;

a first set of switches associated with said first set of capacitors and a second set of switches associated with said second set of capacitors; and said first and second set of capacitors, said first and second set of switches, the at least one energy source and the external load operatively switching between a first mode and a second mode such that:

during the first mode said first set of capacitors are connected to the plurality of microbial fuel cells in parallel by said first set of switches and not connected by said second set of switches or connected to second set of capacitors while said second set of capacitors are connected to the external load in series by said second set of switches and not connected by said first set of switches or connected to said first set of capacitors, and during the second mode said second set of capacitors are connected to the plurality of microbial fuel cells in parallel by said second set of switches and not connected by said first set of switches or connected to first set of capacitors while said first set of capacitors are connected to the external load in series by said first set of switches and not connected by said second set of switches or connected to said second set of capacitors;

thereby alternately charging said first and second set of capacitors in parallel with the plurality of microbial fuel cells and avoiding voltage reversal and discharging said second and first set of capacitors to the external load, respectively, in series and providing an increase in output voltage from the plurality of microbial fuel cells.

11. The electronic circuit of claim 10, wherein said first and second set of capacitors are switched from said parallel arrangement to said series arrangement, and vice versa, by a pair of electronic switches connected to a positive end and a negative end of each capacitor.

12. The electronic circuit of claim 11, wherein said electronic switches are operated by an automated program.

13. The electronic circuit of claim 12, further comprising an array of multiple rechargeable batteries arranged in parallel with the plurality of microbial fuel cells.

14. The electronic circuit of claim 12, further comprising an array of multiple primary batteries arranged in parallel with the plurality of microbial fuel cells.

15. A process for providing increased voltages from a microbial fuel cell (MFC) to an external load, the process comprising:

providing a first set of capacitors and a second set of capacitors;

a first set of switches associated with the first set of capacitors and a second set of switches associated with the second set of capacitors; and connecting the first and second set of capacitors, the first and second set of switches, the microbial fuel cell and the external load such that:

the first and second set of capacitors are connected to the microbial fuel cell (MFC) in parallel when the first and second set of switches are in a first position;

the first and second set of capacitors are connected to the external load in series when the first and second set of switches are in a second position;

alternately charging the first and second set of capacitors with the microbial fuel cell (MFC) by placing the first set of switches and the second set of switches, respectively, in the first position; and alternately discharging the first and second set of capacitors to the external load by placing the first set of switches and the second set of switches, respectively, in the second position;

wherein the first set of capacitors are not connected by the second set of switches or connected to the second set of capacitors and the second set of capacitors are not connected by the first set of switches or connected to the first set of capacitors.

16. The process of claim 15, wherein the first set of capacitors are being charged by the microbial fuel cell (MFC) when the second set of capacitors are being discharged to the external load, and vice versa.

17. The process of claim 16, wherein switching of the first and second set of capacitors between the parallel arrangement with the microbial fuel cell (MFC) and the series arrangement with the external load is performed by an automated program.

18. The process of claim 16, wherein the external load is a rechargeable battery.

19. The process of claim 16, wherein the external load is a microbial electrolysis cell to produce hydrogen.

20. The electronic circuit of claim 1, further comprising at least one energy source and an external load.

21. The electronic circuit of claim 10, further comprising at least one energy source having a plurality of microbial fuel cells and an external load.

22. The process of claim 15, further comprising a step of providing a microbial fuel cell (MFC) and an external load.

* * * * *